United States Patent [19]

Pellerin

[11] Patent Number: 5,353,740

[45] Date of Patent: Oct. 11, 1994

[54] HAY DISTRIBUTING APPARATUS

[75] Inventor: Romain Pellerin, St-Adrien-de-Ham, Canada

[73] Assignee: A. Pellerin Et Fils Ltee, St-Adrien-de-Ham, Canada

[21] Appl. No.: 181,990

[22] Filed: Jan. 14, 1994

[30] Foreign Application Priority Data

Jan. 20, 1993 [GB] United Kingdom ............. 93/010320

[51] Int. Cl.$^5$ .............................................. A01K 5/00
[52] U.S. Cl. ................................... 119/57.92; 119/60; 414/25
[58] Field of Search ..................... 119/51.01, 57.92, 60, 119/57.6; 254/264; 414/24.5, 25, 24.6, 26

[56] References Cited

U.S. PATENT DOCUMENTS

| | | | |
|---|---|---|---|
| 1,185,003 | 5/1916 | Roberts | 414/25 |
| 1,398,437 | 11/1921 | Leighton | 414/25 |
| 1,547,686 | 7/1925 | Rieff | 119/57.6 |
| 1,711,401 | 4/1929 | Baldwin et al. | 212/71 |
| 1,725,380 | 8/1929 | Struensee | 414/25 |
| 1,760,698 | 5/1930 | Hoth . | |
| 2,400,671 | 5/1946 | Wedoe . | |
| 3,625,184 | 12/1971 | Patz | 119/52 B |
| 4,002,147 | 1/1977 | Feterl | 119/60 |
| 4,341,411 | 7/1982 | Edwards | 414/24.5 |
| 4,907,538 | 3/1990 | Helmle et al. | 119/51.01 |
| 4,981,107 | 1/1991 | Beaudoin et al. | 119/56.2 |
| 5,069,165 | 12/1991 | Rousseau | 119/57.6 |

FOREIGN PATENT DOCUMENTS

| | | | |
|---|---|---|---|
| 2672771 | 8/1992 | France | 119/51.01 |
| 1658940 | 6/1991 | U.S.S.R. | 119/51.01 |
| 92008344 | 5/1992 | World Int. Prop. O. | 119/51.01 |

*Primary Examiner*—John G. Weiss
*Attorney, Agent, or Firm*—Ware, Fressola, Van Der Sluys & Adolphson

[57] ABSTRACT

The apparatus is provided for automatically distributing hay for feeding livestock scattered along a predetermined path along which an overhead beam extends. The apparatus comprises a driving unit moving along the beam. The driving unit has a carriage mounted onto the base and provided with wheels mechanically connected to the beam and to an electrical motor for moving the apparatus along the beam. The apparatus supports a hay bale, more particularly a rolled hay bale, with the use of a rod having an end for connection with the driving unit and an opposite end connected to a supporting member supporting the hay bale. The apparatus also has a winch mounted on the driving unit base for lifting and lowering the hay bale.

18 Claims, 3 Drawing Sheets

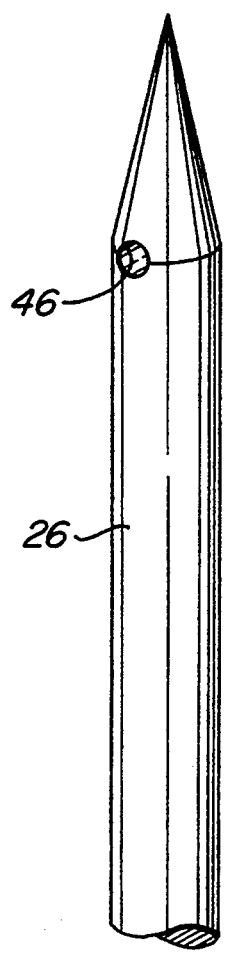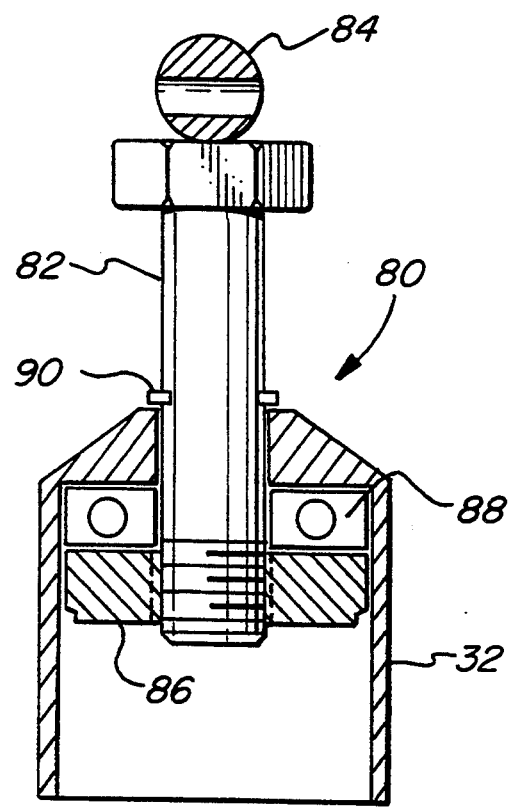
FIG. 3
FIG. 4

HAY DISTRIBUTING APPARATUS

BACKGROUND OF THE INVENTION a) Field of the Invention

The present invention relates to a hay distributing apparatus for feeding livestock scattered along a predetermined path along which an overhead beam extends.

b) Brief Description of the Prior Art

Known in the art, there is U.S. Pat. No. 3,625,184 of P. PATZ granted on Dec. 7, 1971. This patent describes a self-propelled feed distributing apparatus including a travelling conveyor driven by a pair of drive wheels along a rail system. The travelling conveyor is also provided with a drive arrangement which makes it possible to stop the travelling conveyor at any point along the length of the feed bunk and to continue to feed grain or silage to that point in the feed bunk.

Also known in the art, there is U.S. Pat. No. 5,069,165 of V. ROUSSEAU granted on Dec. 3, 1991. This patent describes a livestock feeder system including a mobile feeder unit operatively suspended to an overhead guide track. The system includes a programmable control unit to preset the different individualized rations of feed, animal or stall position identifiers, and electric sensors to detect the position and discharge the right ration at the right position for any particular animal.

Also known in the art, there are the following U.S. patents which describe different feed carriers and distributors:

U.S. Pat. No. 1,547,686 of J.G. RIEFF et al., granted on Jul. 28, 1925;

U.S. Pat. No. 4,981,107 of G. BEAUDOIN et al., granted on Jan. 1, 1991.

One drawback with those feed moving carriers and distributors is that they are not well adapted to carry a hay bale, more particularly a rolled hay bale. Furthermore, they are not well provided with adequate lifting devices, which allow the hay bale to be easily lifted for its transport and distribution.

OBJECTS AND SUMMARY OF THE INVENTION

It is therefore an object of the present invention to provide an automatic hay distributing apparatus which is well adapted to lift and carry a hay bale.

In accordance with the present invention, the above objects are achieved with an automatic hay distributing apparatus for feeding livestock scattered along a predetermined path along which an overhead beam extends, the apparatus comprising:

a driving unit for moving the apparatus along the beam, the driving unit including:
 a base;
 a carriage mounted onto the base and provided with wheels mechanically connected to the beam for allowing translation of the base; and
 driving means mechanically connected to the wheels for moving the apparatus along the beam;

supporting means for supporting a hay bale, the supporting means including a rod for insertion into the hay bale, the rod having a first end for connection with the driving unit and a second end for connection with a supporting member provided for supporting the hay bale;

Lifting means mounted onto the driving unit for lifting and lowering the hay bale, the lifting means comprising connecting means for connection with the rod; and means for controlling movement of the driving unit along the overhead beam.

It is also an object of the present invention to provide a method for automatically distributing hay for feeding livestock scattered along a predetermined path along which an overhead beam extends, the method comprising the steps of:

(a) inserting a rod into a hay bale, the rod having a first end projecting from the hay bale, and a second opposite end projecting from the hay bale for receiving a supporting member for supporting the hay bale;

(b) removably securing the supporting member to the second end of the rod;

(c) connecting the first end of the rod to a lifting device mounted on a driving unit, the driving unit being operatively connected to the overhead beam and movable thereon;

(d) operating the lifting device for lifting the hay bale to a height where the hay bale is freely hanging over the ground; and (e) moving the driving unit along the overhead beam according to a predetermined pattern for feeding livestock.

It is still an object of the present invention to provide a method for automatically distributing hay for feeding livestock scattered along a predetermined path along which an overhead beam extends, the method comprising the steps of:

(a) inserting a rod into a hay bale, the rod having a first end projecting from the hay bale and a second opposite end projecting from the hay bale, a supporting member for supporting the hay bale being connected to the second end of the rod;

(b) connecting the first end of the rod to a lifting device mounted on a driving unit, the driving unit being operatively connected to the overhead beam and movable thereon;

(c) operating the lifting device for lifting the hay bale to a height where the hay bale is freely hanging over the ground; and (d) moving the driving unit along the overhead beam according to a predetermined pattern for feeding livestock.

A non restrictive description of a preferred embodiment will now be given with reference to the appended drawings.

BRIEF DESCRIPTION OF THE DRAWINGS

FIG. 3 is an enlarged view of the first end of the rod of FIG. 1.

FIG. 4 is a cross-sectional view taken along line IV—IV in FIG. 2.

DESCRIPTION OF A PREFERRED EMBODIMENT

Figure 1:
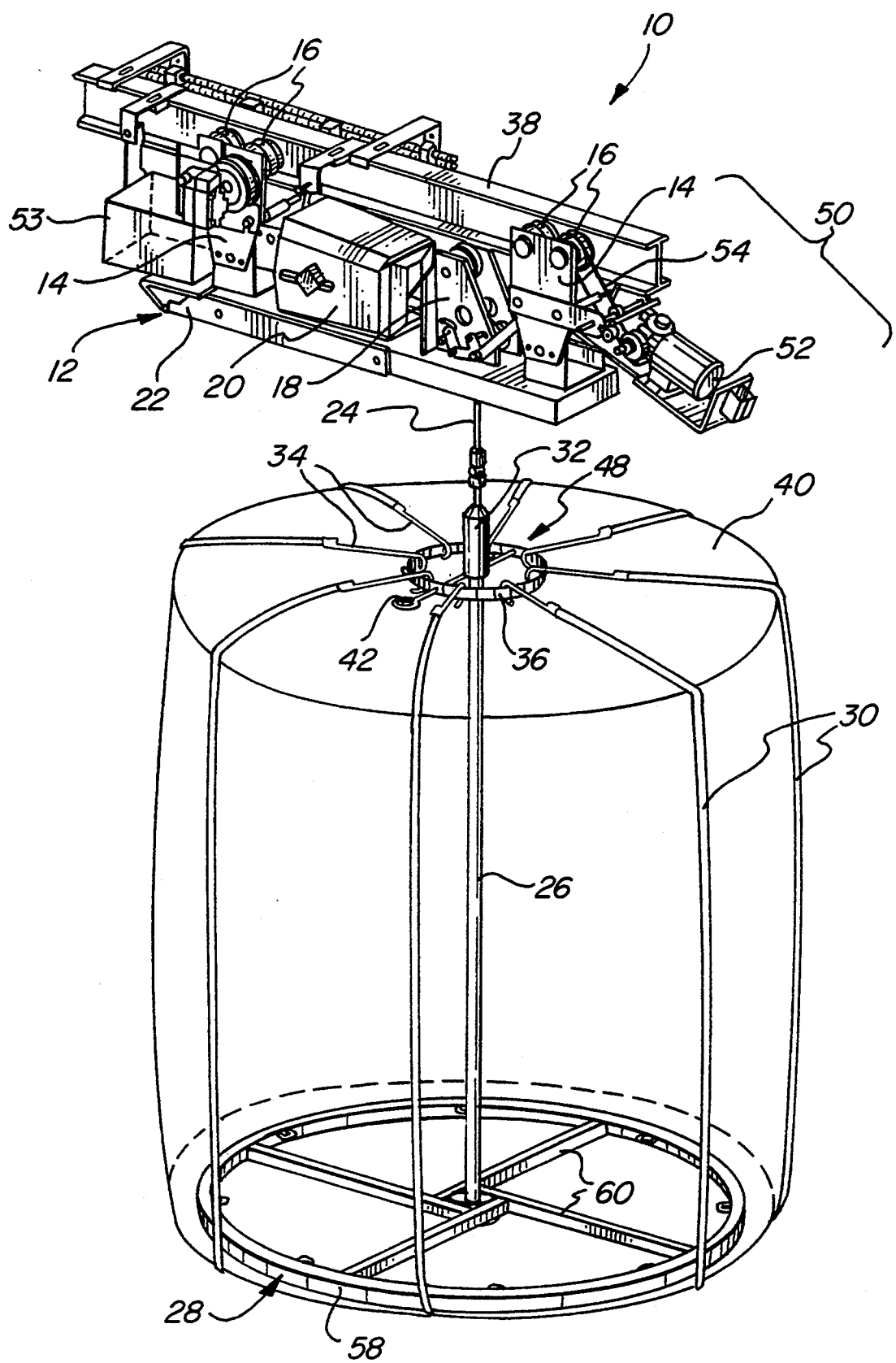
FIG. 1 is a perspective view of the hay distributing apparatus according to the present invention.
Figure 2:
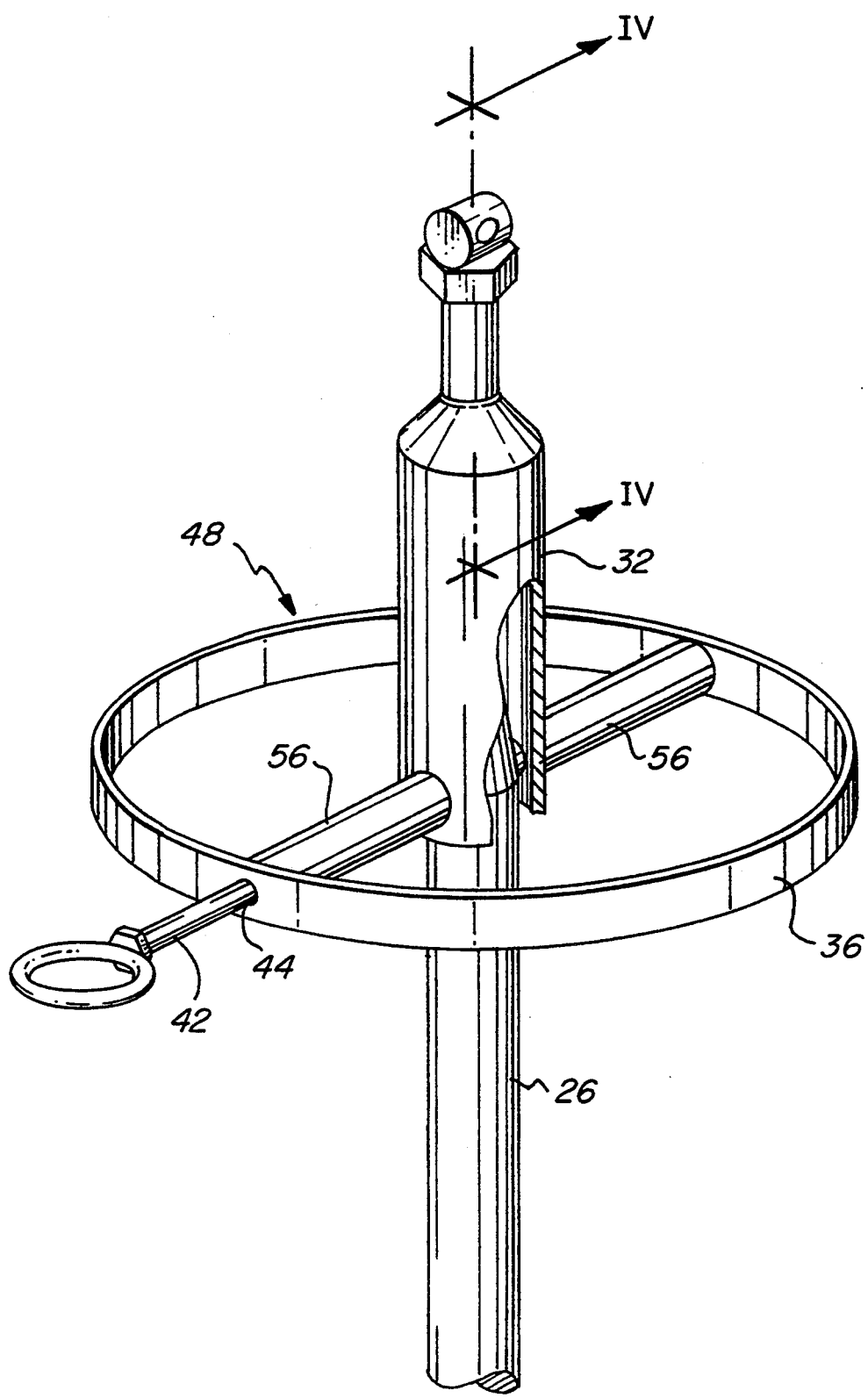
FIG. 2 is an enlarged perspective view of the connecting assembly of FIG. 1.

In the following description and in the drawings, the same numerals will refer to the same elements.

In FIG. 1, there is shown an automatic hay distributing apparatus for feeding livestock scattered along a predetermined path along which an overhead beam 38 extends. Preferably, the apparatus distributes hay bales 40, and more specifically rolled hay bales, which are increasingly used nowadays.

The apparatus 10 has a driving unit 12 which includes a base 22 and a carriage 14 mounted onto the base 22. The carriage comprises two separate parts, each provided with wheels 16 mechanically connected to the beam 38 for allowing translation of the base 22.

The driving unit 12 also includes a driving mechanism 50 for moving the apparatus 10 along to the overhead beam 38. This driving mechanism comprises an electrical motor 52 mechanically connected to the wheels 16 by two timing belts 54. The electrical motor 52 is supplied with operating power by a battery 53 mounted onto the base 22. Alternatively, the electrical motor 52 may also be supplied by electric network power transmitted through the sides of the overhead beam 38.

In another embodiment of the present invention, it is possible to omit the driving mechanism and to push the apparatus 10 by hand. The operator may then tear off a portion of the hay bale 40 for feeding the livestock. This allows to considerably ease the displacement of the hay bale 40.

The apparatus 10 is provided with a supporting assembly for supporting the hay bale 40. This supporting assembly includes a rod 26 for insertion into the hay bale 40, and a rack 28 for supporting the hay bale 40 once the rod 26 is set vertically. Preferably, the rod 26 is inserted axially into the hay bale 40, for ensuring that the hay bale 40 is well kept in position on the rack 28. The rack 28 is connected to a second end of the rod 26 and generally consists of an annular member 58 and bars 60 rigidly secured together. Of course, a platform or another suitable device, as can be apparent to those skilled in the art, can be used for supporting the hay bale 40. The rack 28 may either be rigidly or removably connected to the rod 26. If it is removably connected, the rack 28 may be installed on the rod 26 before or after the rod 26 is inserted into the hay bale 40.

The apparatus 10 is also provided with a winch 18, for lifting and lowering the hay bale 40. Preferably, the hay bale 40 is being lifted to a height where it is freely hanging over the ground. This winch 18 is mounted onto the base 22 and is provided with a cable 24. Of course, another suitable mechanism for lifting and lowering the hay bale 40 can be used, such as a hydraulic actuator (not shown).

The winch 18 is also provided with a connecting member 48 for connection with the rod 26. The connecting member includes a sleeve 32 connectable to a free end of the cable 24 for slidably receiving a first end of the rod 26. The sleeve 32 includes a side-to-side radial aperture 44 aligned with the corresponding radial aperture 46 made through the rod 26 (see FIG. 3). The sleeve 32 has an annular member 36 connected thereto by means of two cylindrical members 56, each being provided with circular channels aligned with the first and second apertures, respectively 44 and 46.

A pin 42 is inserted into the apertures 44 and 46, for locking the rod 26 to the sleeve 32.

As shown in FIG. 4, the junction between the cable 24 and the sleeve 32 is preferably a pivot 80 allowing the hay bale 40 to rotate around a vertical axis. The pivot 80 comprises a bolt 82 provided with an eyelet 84. The bolt 82 has a lower end in mesh with a nylon insert 86 and an axial bearing 88 is provided between the insert 86 and the upper part of the sleeve 32. In use, the insert 86 is urged against the bearing 88 and relative movement between the bolt 82 and the sleeve 32 is allowed. A circlip 90 prevents the bolt 82 from falling inside the sleeve 32 when the hay bale 40 is not freely hanging.

Preferably, the apparatus may be provided with a plurality of resilient elongated members 30 connected between the rack 28 and the annular member 36. These members 30 are wrapped around the hay bale 40 and keep it in position, even while being consumed, on the rack 28. As shown in FIG. 1, the resilient elongated members 30 are connected to the annular member 36 by means of hooks 34 at their ends.

The apparatus has a programmable unit 20 mounted onto the base 22 for controlling the movement of the driving unit 12 along the overhead beam 38. In operation, the movement of the driving unit 12 is programmed by the user, preferably for allowing movement at a preselected speed along the overhead beam 38. Preferably, the driving unit 12 is programmed to travel at a constant speed and back and forth along the overhead beam 38 so as to ensure that each of the animals is well fed. Moving the unit 12 at a constant speed usually gives good results because the animals cannot take a long time to eat and they are forced to rapidly take a bite in the hay bale 40 when it is in front of them, never knowing if the unit 12 will come back again.

For heavy hay consumption, it is possible to have two or more hay bales 40 on each apparatus 10 by providing appropriate lifting means arrangements. Additionally, it is also possible to have two or more adjacent apparatuses 10 linked together, only one being provided with a motor 52 if desired.

As aforesaid, the junction between the cable 24 and the sleeve 28 is preferably comprising a pivot 80. The main advantages of such an arrangement is that the pivot 80 allows the rotation of the hay bale 40. This rotating motion may be actuated each time animals are taking a bite from the hay bale 40 and the hay bale 40 will then be evenly eaten. It can also be turned by hand by the operator if it is necessary.

The present invention is also provided with a method for automatically distributing hay for feeding livestock scattered along a predetermined path. This method comprises various steps as already described in the present description of a preferred embodiment.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

I claim:

1. An automatic hay distributing apparatus for feeding livestock scattered along a predetermined path along which an overhead beam extends, said apparatus comprising:

a driving unit for moving said apparatus along said beam, said driving unit including:

a base;

a carriage mounted onto said base and provided with wheels adapted to be mechanically connected to said beam for allowing translation of said base along said beam; and driving means mechanically connected to said wheels for moving said apparatus along said beam;

supporting means for supporting a hay bale, said supporting means including a rod for insertion into said hay bale, said rod having a first end for connection with said driving unit and a second end for connection with a supporting member provided for supporting said hay bale;

lifting means mounted onto said driving unit for lifting and lowering said hay bale, said lifting means comprising connecting means for connection with said rod; and means for controlling movement of said driving unit along said overhead beam.

2. An apparatus according to claim 1, wherein said hay bale is a rolled hay bale.

3. An apparatus according to claim 1, wherein said supporting member is a rack.

4. An apparatus according to claim 1, further comprising a plurality of resilient elongated members operatively connected to said supporting member and an upper location adjacent to said connecting means, said resilient elongated members being provided for wrapping around said hay bale and keeping said hay bale in position on said supporting member.

5. An apparatus according to claim 1, wherein said lifting means comprise a winch provided with a cable.

6. An apparatus according to claim 5, wherein said connecting means include:

a sleeve connected to a free end of said cable for slidably receiving said first end of a rod, said sleeve being provided with a first radial aperture aligned with a corresponding second radial aperture made through said rod; and a pin for insertion into said apertures.

7. An apparatus according to claim 6, wherein said sleeve is pivotally connected to said cable by means of a swivel for allowing said hay bale to rotate around a vertical axis.

8. An apparatus according to claim 1, wherein said driving means comprise an electrical motor mechanically connected to said wheels by a belt.

9. An apparatus according to claim 8, further comprising a battery mounted to said driving unit for supplying operating power to said electrical motor.

10. A hay distributing apparatus for feeding livestock scattered along a predetermined path along which an overhead beam extends, said apparatus comprising:

a driving unit for moving said apparatus along said beam, said driving unit including:

a base; and a carriage mounted onto said base and provided with wheels adapted to be mechanically connected to said beam for allowing translation of said base along said beam;

supporting means for supporting a hay bale, said supporting means including a rod for insertion into said hay bale, said rod having a first end for connection with said driving unit and a second end for connection with a supporting member provided for supporting said hay bale; and lifting means mounted onto said driving unit for lifting and lowering said hay bale, said lifting means comprising connecting means for connection with said rod.

11. A method for automatically distributing hay for feeding livestock scattered along a predetermined path along which an overhead beam extends, said method comprising the steps of:

(a) inserting a rod into a hay bale, said rod having a first end projecting from said hay bale, and a second opposite end projecting from said hay bale for receiving a supporting member for supporting said hay bale;

(b) removably securing said supporting member to said second end of said rod;

(c) connecting said first end of said rod to a lifting device mounted on a driving unit, said driving unit being operatively connected to said overhead beam and movable thereon;

(d) operating said lifting device for lifting said hay bale to a height where said hay bale is freely hanging over the ground; and (e) moving said driving unit along said overhead beam according to a predetermined pattern for feeding livestock.

12. A method according to claim 11, wherein in said step (a), said hay bale is a rolled hay bale, said rod being substantially axially inserted into said hay bale.

13. A method according to claim 11, wherein in said step (e), said driving unit is moved at a constant speed.

14. A method according to claim 13, wherein in said step (e), said driving unit is moved back and forth along said path for a plurality of times during each pattern.

15. A method for automatically distributing hay for feeding livestock scattered along a predetermined path along which an overhead beam extends, said method comprising the steps of:

(a) inserting a rod into a hay bale, said rod having a first end projecting from said hay bale, and a second opposite end projecting from said hay bale, a supporting member for supporting said hay bale being rigidly connected to said second end of said rod;

(b) connecting said first end of said rod to a lifting device mounted on a driving unit, said driving unit being operatively connected to said overhead beam and movable thereon;

(c) operating said lifting device for lifting said hay bale to a height where said haybale is freely hanging over the ground; and (d) moving said driving unit along said overhead beam according to a predetermined pattern for feeding livestock.

16. A method according to claim 15, wherein in said step (a), said hay bale is a rolled hay bale, said rod being substantially axially inserted into said hay bale.

17. A method according to claim 15, wherein in said step (d), said driving unit is moved at a constant speed.

18. A method according to claim 17, wherein in said step (d), said driving unit is moved back and forth along said path for a plurality of times during each pattern.

* * * * *

UNITED STATES PATENT AND TRADEMARK OFFICE
CERTIFICATE OF CORRECTION

PATENT NO. : 5,353,740
DATED     : October 11, 1994
INVENTOR(S) : Pellerin

It is certified that error appears in the above-indentified patent and that said Letters Patent is hereby corrected as shown below:

Claim 15, column 6, line 48 ; change "haybale" to
-- hay bale --.

Signed and Sealed this

Third Day of January, 1995

Attest:

BRUCE LEHMAN

*Attesting Officer*    *Commissioner of Patents and Trademarks*